A. B. OWEN.
STARTING SYNCHRONOUS ELECTRIC MACHINES.
APPLICATION FILED SEPT. 27, 1913.
1,171,635. Patented Feb. 15, 1916.
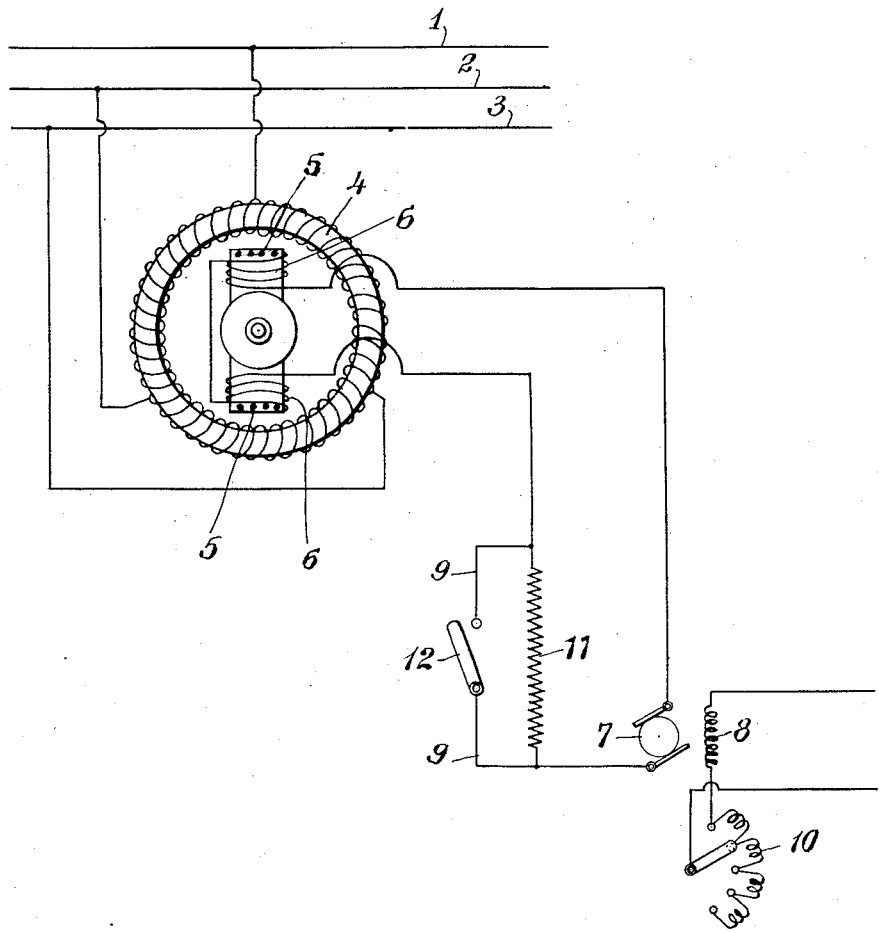
WITNESSES
INVENTOR
Alden B. Owen
BY
Kenyon & Kenyon
ATTORNEYS

UNITED STATES PATENT OFFICE.

ALDEN B. OWEN, OF RIDGWAY, PENNSYLVANIA.

STARTING SYNCHRONOUS ELECTRIC MACHINES.

1,171,635.  Specification of Letters Patent.  Patented Feb. 15, 1916.

Application filed September 27, 1913. Serial No. 792,094.

*To all whom it may concern:*

Be it known that I, ALDEN B. OWEN, a citizen of the United States, and a resident of Ridgway, Elk county, State of Pennsylvania, have invented certain new and useful Improvements in Starting Synchronous Electric Machines, of which the following is a specification.

My invention relates to the starting of synchronous electric machines such as synchronous motors and converters.

The main object of my invention is to provide an arrangement and method by which the field is made to place itself in proper relation to the armature current as such a machine attains synchronous speed on starting up.

In prior synchronous machines when started up, and when the circuit to the field is closed, it is a matter of chance as to whether the polarity of the field will agree with the polarity of the magnetism set up by the armature current, so that the machine will hunt or lag. To overcome this trouble, in the preferred embodiment of my invention I connect the exciter permanently to the fields and place in series with both of them a suitable resistance by means of which the induced current in the field is cut down to a safe limit and preferably also the current from the exciter is made relatively small on starting, and then when the machine has reached synchronous speed the resistance is cut out and the exciting current made normal.

Further objects, features and advantages will more clearly appear from the detailed description given below taken in connection with the accompanying drawing which illustrates a system embodying my invention in one form.

Referring to the drawing, 1, 2 and 3 represent alternating current mains which feed the stationary armature or stator 4 of the synchronous motor. The rotating field may be provided with the usual squirrel-cage winding 5 and is, also, provided with the direct current field windings 6.

7 represents the armature of an exciter, provided with a field 8 supplied from any suitable source of electrical energy. In series with the field 8 is a rheostat 10 by which the strength of the field 8 may be adjusted. The exciter 7 is connected in series with the field 6 to supply the same, and connected in series with both the field 6 and exciter 7 is a resistance 11.

9 represents a circuit in shunt around the resistance 11 having a switch 12 in series therein by which the resistance 11 may be cut out of circuit.

In starting up the motor the stator is connected with the alternating current mains with the switch 12 open and the exciter 7 operating, but preferably with its field so weak that the current supplied to the field 6 thereby is weak. The machine starts as an induction motor, currents being induced in the squirrel-cage winding 5. An alternating current electro-motive force will, also, be induced in the field 6 the voltage of which may be considerable, but since the resistance 11 is included in circuit the resulting alternating current will be small and yet the voltage at the slip rings be kept down to such value as not to be disadvantageous. Since, however, the exciter 7 supplies a small direct current to the circuit the resultant field will be one which is more strongly polarized in one direction than the other. As the machine approaches synchronous speed the alternating current becomes weaker while the exciter current becomes relatively stronger so that the field will assume a polarity always in the same direction and will naturally place itself in proper position with respect to the rotating field produced by the armature 4. Upon reaching synchronous speed the switch 12 is closed and the exciter 7 is made to furnish the necessary exciting current to the field 6. This may be done by increasing the strength of the field 8 of the exciter, by means of the rheostat 10. Thereupon the motor proceeds to operate as a synchronous motor, in a well known manner.

From the above it will appear that I have provided an especially simple and efficient method for causing the motor field always to have the proper polarity as it is brought into synchronism.

It will be obvious to those skilled in the art that the embodiment of my invention described and illustrated in detail is but one of many forms in which my invention may be embodied.

Having fully and clearly described my improvements, what I claim as new and desire to secure by Letters Patent, is:

1. The method of starting a synchronous electric machine which consists in supplying alternating current thereto to start the machine as an induction motor, and applying a source of direct current to the direct current field coils of the machine at the start to polarize the field.

2. The method of starting a synchronous electric machine which consists in supplying alternating current thereto to start the machine as an induction motor, applying a source of direct current to the direct current field coils of the machine at the start and decreasing the resistance of the direct current field circuit upon the machine reaching synchronous speed.

3. The method of starting a synchronous electric machine which consists in supplying alternating current to start the machine as an induction motor, applying a weak source of direct current to the field coils of the machine substantially before attainment of the maximum speed of the machine possible under induction motor operation, and still below the speed at which the motor will slip into synchronism under direct current excitation, and increasing the strength of the direct current source upon the machine reaching synchronous speed.

4. The method of starting a synchronous electric machine which consists in supplying alternating current thereto to start the machine as an induction motor, and applying a source of direct current to the field coils of the machine substantially before attainment by the machine of the maximum speed possible under induction motor operation and still below the speed at which the motor will slip into synchronism under direct current excitation.

5. The method of starting a synchronous electric machine which consists in supplying an alternating current thereto to start the machine as an induction motor and applying a source of direct current to the field coils of the machine substantially before the attainment by the machine of that speed at which it will slip into synchronism under a direct current excitation of the field coils.

6. The method of starting and synchronizing a synchronous dynamo-electric machine which comprises supplying alternating current to one member thereof, and direct current to the field coils, during acceleration, the alternating current and direct current being initially supplied to the machine before the machine attains the speed at which the motor will slip into synchonism upon excitation of the field by direct current so long as the other member of the machine is excited by alternating current.

In testimony whereof, I have signed my name to this specification, in the presence of two subscribing witnesses.

ALDEN B. OWEN.

Witnesses:
C. E. LOCKHART,
C. A. FAY.